United States Patent [19]

McGaffigan et al.

[11] Patent Number: 5,227,596
[45] Date of Patent: Jul. 13, 1993

[54] SELF REGULATING CONNECTING DEVICE CONTAINING FUSIBLE MATERIAL

[75] Inventors: Thomas H. McGaffigan, Half Moon Bay; Jack A. McCullough, Saratoga, both of Calif.

[73] Assignees: Metcal, Inc., Menlo Park, Calif.; AMP Incorporated, Middleton, Pa.; a part interest

[21] Appl. No.: 602,352

[22] Filed: Oct. 22, 1990

[51] Int. Cl.⁵ .............................................. H05B 6/10
[52] U.S. Cl. .................... 219/10.43; 219/10.53; 219/10.491; 219/10.77
[58] Field of Search ............. 219/10.41, 10.43, 10.491, 219/10.75, 10.53, 10.57, 10.79, 9.5, 85.11, 85.1, 10.77

[56] References Cited

U.S. PATENT DOCUMENTS

| | | | |
|---|---|---|---|
| 4,590,347 | 5/1986 | Thatcher et al. | 219/10.491 |
| 4,717,814 | 1/1988 | Krumme | 219/10.77 |
| 4,852,252 | 8/1989 | Ayer. | |
| 4,914,267 | 4/1990 | Derbyshire | 219/85.1 |
| 4,940,870 | 7/1990 | Shibata et al. | 219/10.491 |
| 4,987,283 | 1/1991 | Beinhaur et al. | 219/85.11 |
| 4,987,291 | 1/1991 | McGaffigan et al. | 219/549 |
| 4,991,288 | 2/1991 | Scholz. | |
| 4,995,838 | 2/1991 | Ayer et al. | |

Primary Examiner—Philip H. Leung
Attorney, Agent, or Firm—Burns, Doane, Swecker & Mathis

[57] ABSTRACT

In accordance with the present invention, a heater element which includes a layer of ferromagnetic material is included in a connecting device along with a fusible material such as a solder preform. The connecting device includes, for example, a hollow sleeve formed of heat shrinkable material. The solder preform, the heater element and the heat shrinkable hollow sleeve are integrally formed as a self-contained solder sleeve device such that the heater element is separate from the objects to be joined and does not completely shield to generation of an inductive current in the objects to be joined. The connecting device thus promotes even flow and bonding of the fusible material around a junction between the objects. Further, a connecting device is provided which permits visual inspection of a connection between objects bonded upon activation of the connecting device, thus providing an opportunity to confirm the integrity of the junction.

27 Claims, 4 Drawing Sheets

SELF REGULATING CONNECTING DEVICE CONTAINING FUSIBLE MATERIAL

BACKGROUND OF THE INVENTION

The present invention relates to an apparatus for assisting in the connection of objects to be joined, and more particularly, to devices containing fusible material for connecting two or more objects which form, for example, part of an electrical circuit. Further, the present invention relates to a method for making such connections.

Presently, devices are known which contain fusible materials to assist in forming a connection. For example, U.S. Pat. No. 3,243,211 discloses a solder sleeve device defined by a hollow heat recoverable sleeve containing a fusible material. Upon insertion of one or more objects to be joined into the device, heating of the device causes the fusible material to melt and to contact the object or objects whereby upon cooling, a bonding of the objects is effected. Because an external heat source (e.g., hot air, infrared radiant source, etc.) is needed to melt the fusible material, damage of the objects to be bonded and other adjacent objects can occur due to overheating. For example, in electronics arts, such overheating can destroy delicate integrated circuits. Further the usefulness of such devices for joining wires, tubes or members which are large effective heat sinks is limited since the necessary large amounts of heat can not be transferred through the device without causing damage.

U.S Pat. No. 4,852,252 discloses a plurality of terminals already disposed in a housing of an electrical connector, including solder tails extending rearwardly from the housing which may have a thin layer of magnetic material deposited on an outer surface thereof so that respective wire ends may be placed there along with solder preforms within lengths of heat recoverable tubing may be placed there around and a high frequency current induced in a magnetic layer which then generates thermal energy sufficient to melt the solder and shrink the tubing forming terminations between the wires and the terminals. Unfortunately this structure is limited in application because the geometry of the heater is dictated by the connector contact design not by the heating requirements. The limitation of predisposing the heater material on the connector terminals at time of manufacture limits heater size, shape, location, power generation and self regulation temperature to a fixed specification. It would be advantageous to have devices that can be matched to the connection requirements i.e. power, temperature, location, etc. and do not need a connector terminal, i.e. does not need to be an integral part of the elements being connected. The present invention provides individual self heating connection devices having such advantages which also allows it to be retrofitted.

U.S. Pat. No. 4,914,267, the disclosure of which is hereby incorporated by reference in its entirety, also relates to devices which contain fusible materials to assist in forming connections. The fusible materials may be any number of meltable materials (e.g.: solders, brazing materials, heat curable potting compounds, heat flowable plastics, and so forth). As disclosed in U.S. Pat. No. 4,914,267, a hollow cylindrical autoregulating heater is incorporated into the device, the temperature of which is maintained during melting of the fusible material at a temperature not appreciably above the melting temperatures of such material. The device itself thus becomes an active element of the circuit heating itself, the fusible material and the objects to be joined or connected.

The devices disclosed therein have a continuous, hollow heater structure which completely surrounds the members to be joined limiting the scope of application of such devices. It would be advantageous to have a device not having such a geometric limitation based on an effort to achieve a closely inductively coupled heater. The present invention is an improvement over the device disclosed in U.S. Pat. No. 4,914,267 since it does not have such a spacial limitation.

SUMMARY OF THE INVENTION

In accordance with the present invention, a heater element which includes a layer of ferromagnetic material is included in a connecting device along with a fusible material such as a solder preform. This connecting device includes, for example, a hollow insulating sleeve formed of heat shrinkable material. The solder preform, the heater element and the heat shrinkable hollow sleeve are integrally formed and arranged such that the heater element does not act as a shield to generation of a inductive current in the objects to be joined.

This device thus exhibits good temperature self-regulation and promotes even flow and bonding of the fusible material around a junction between the objects Further, a device is provided which permits visual inspection of a connection between objects bonded upon activation of the connecting device, thus providing an opportunity to confirm the integrity of the junction In operation, induced current flow in the ferromagnetic heater element generates heat which causes the heat shrinkable material to recover forcing the heating element in contact with the objects to be joined. Simultaneously, the solder preform melts and fuses objects together. Because the heater element has a Curie temperature greater than that of the solder, the solder becomes molten and flows to effect a bond between the objects inserted into the connecting device. The heat shrinkable material then further recovers to seal the solder sleeve device.

Because the heater element is formed with a pretinned layer, the connecting device is universally applicable to objects which have not been pre-treated for a solder connection. Accordingly, a compact, cost efficient connecting device which is universally applicable to most connections and which actively participates in achieving an effective connection using an external current source can be provided.

In one aspect there is provided a connecting device having a fusible material and a heating element having a predetermined Curie temperature, said heating element integral with the connecting device and independent of objects to be joined thereby, said heating element including a copper layer and a ferromagnetic layer adjacent said copper layer, the shape of said heating element being independent of the configuration of an induction coil useful to energize said connecting device, said shape only partially encompassing objects to be joined within said connecting device such that said ferromagnetic layer is magnetically discontinuous.

In another aspect there is provided a solder sleeve device for connecting two or more objects having a heat recoverable hollow insulating sleeve and a fusible material disposed internally of said hollow insulating sleeve and a heater element disposed internally of said hollow insulating sleeve, the shape of said heater element being independent of the configuration of an induction coil useful to affect said connecting device, said shape only partially encompassing objects to be joined within said connecting device such that said ferromagnetic layer is magnetically discontinuous, said heater element including a pretinned layer of a first material and a layer of a second material having a predetermined Curie temperature, a first surface of said second material having a non-solder wetting coating.

In yet another aspect there is provided a connecting device for connecting two or more objects including a heat recoverable hollow insulating sleeve, a fusible material disposed internally of said hollow sleeve and a heater element having a predetermined Curie temperature, said heater element being supported by said fusible material internally of said hollow insulating sleeve, the shape of said heating element being independent of the configuration of an induction coil useful to affect said connecting device, said shape only partially encompassing articles to be joined within said connecting device such that said ferromagnetic layer is magnetically discontinuous.

In still another aspect there is provided a method for connecting two or more objects having the steps of a connecting device which includes a heat recoverable hollow insulating sleeve having a fusible material and a heater element disposed internally of said hollow sleeve, inducing a current in said heater element which is discontinuous around said heater such that said heat recoverable hollow insulating sleeve contracts, bringing the heater element into contact with objects to be joined and placing said fusible material into contact with at least one of said objects to be connected comprising the steps of inserting said objects into opposite ends of a solder device which includes a heat recoverable hollow insulating sleeve having a fusible material and a heater element disposed internally of said hollow sleeve, inducing a current in said heater element which does not flow continuously around said heater such that said heat recoverable hollow insulating sleeve contracts, bringing the heater element into contact with objects to be joined and placing said fusible material into contact with at least one of said objects.

BRIEF DESCRIPTION OF THE DRAWING

The present invention can be further understood with reference to the following detailed description of preferred embodiments in conjunction with the accompanying drawing, wherein like elements are provided like reference numerals and wherein.

DETAILED DESCRIPTION OF THE PREFERRED EMBODIMENTS

For purposes of the following discussion, reference will be made to a self-regulating connecting device for joining objects such as electrical wires using a fusible material such as solder. However, it will be appreciated by those skilled in the art that, as with U.S. Pat. No. 4,914,267, principles of the present invention are equally applicable to, for example, mechanical or plumbing applications wherein the elements to be joined by any known fusible material possess the ability to themselves conduct electrical energy and generate heat.

U.S. Pat. No. 4,914,267 relates to devices which make use of the skin effect produced in ferromagnetic bodies when a constant alternating current is applied thereto. Upon application of such a current to a ferromagnetic body, a major proportion of the current is concentrated in a region adjacent a ground return plate for the current This region is defined by the equation:

$$S.D. = 5030 \sqrt{\frac{1p}{\mu f}} \text{ cm;}$$

where S.D. is skin depth, p is resistivity, $\mu$(mu) is a measure of the ferromagnetic properties of the material, and f is the frequency of the alternating current source. The skin depth may therefore be controlled by controlling p, $\mu$, and f.

For example, alloy 42 has p=70 to $80\times10^{-6}$ ohm cms and $\mu=200$ to 600, while Low Carbon Steel has p=$10\times10^{-6}$ ohms cms and $\mu=1000$. The current source frequency may be chosen to suit the needs of the device. For example, frequencies of 8–20 MHz can be used to reduce the thickness of the layer of magnetic material required and to produce large autoregulating ratios. Because current falls off in accordance with $e^{-x}$, where x is the depth into the ferromagnetic layer, most of the current (e.g., 83%) is concentrated in 1.8 times the skin depth.

Excellent regulation can thus be achieved using a ferromagnetic layer 1.8 skin depths thick which is in electrical and thermal contact with a layer of high conductivity material having a value of mu equal to one, such as copper. When the Curie temperature of the ferromagnetic material is approached, the value of mu for the material and the material's resistivity approach that of copper. To prevent damaging levels of magnetic flux or skin currents, the thickness of the copper layer should be 5 to 10 times the skin depth.

The term "constant current" as employed herein does not mean a current that cannot increase but means a current that obeys the following formula:

$$\frac{\Delta I}{I} > -\tfrac{1}{2}\frac{\Delta R}{R}$$

Specifically, in order to autoregulate, the power delivered to the ferromagnetic heater element when it exceeds Curie temperature should be less than the power delivered when the ferromagnetic heater element is below Curie temperature. Provided the current is reduced sufficiently to reduce heating, autoregulation is achieved. Thus, when large autoregulating ratios are not required, constraints on the degree of current control may be relaxed thus reducing the cost of the power supply.

In operation, a constant high frequency AC current is either directly or inductively passed through a solder sleeve device which includes ferromagnetic material, causing the device to heat until its Curie temperature is reached. At such time, the effective resistance of the device reduces and the power dissipation falls. By proper selection of current frequency and resistivity and thickness of materials, the temperature is thus maintained at about the Curie temperature of the magnetic material of the device.

Figure 1:
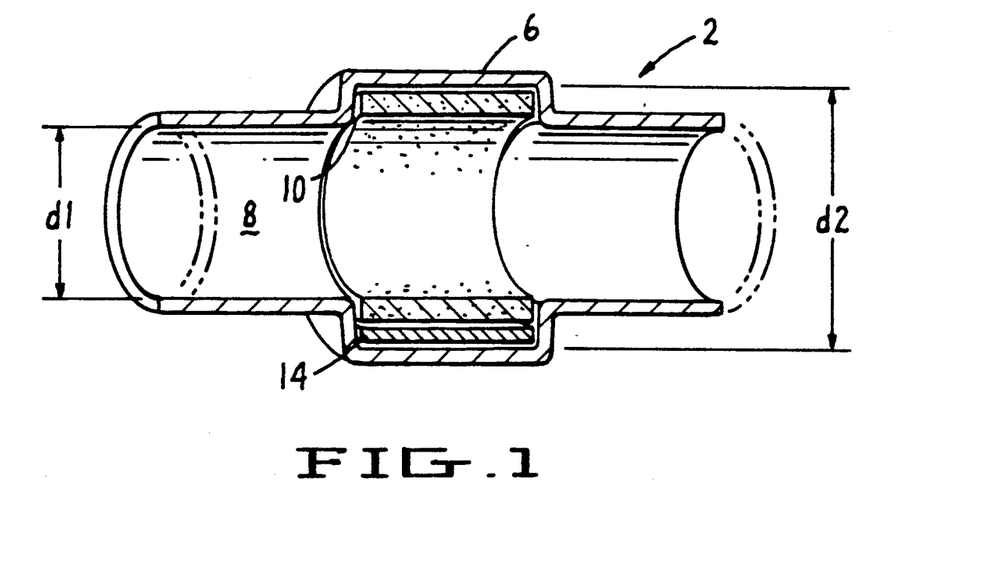
FIG. 1 is a preferred embodiment of a connecting device designed in accordance with the present invention.

A first preferred embodiment of a self-regulating connecting device designed in accordance with the present invention is illustrated in FIG. 1. As shown in FIG. 1, a solder sleeve device 2 includes a heat shrinkable, plastic sleeve 4 formed with hollow tubular shape of roughly circular cross-section at either end. The hollow sleeve is formed with a central portion 6 which has an inner diameter greater than that of either end of the hollow sleeve and which thus form s a protrusion about the outer surface of the hollow sleeve.

The central portion of the hollow sleeve corresponds to approximately one quarter of the length of the hollow sleeve and is centered about the midpoint of the sleeve's length as shown in FIG. 1. However, it will be appreciated by those skilled in the art that the proportional length of the central portion as well as the overall length and diameter of the hollow sleeve can be varied to accommodate different sized objects to be joined by the connecting device.

The hollow sleeve thus formed provides an inner cylindrical area 8 of relatively constant inner diameter d1 having a central inner area with inner diameter d2, d2 being greater than d1. A solder preform 10 of ring-like cylindrical shape is provided in the central inner area. Further, a ferromagnetic heater element 14 facing the tubular sleeve is provided between an outer surface of the solder preform and the hollow sleeve.

Because the ferromagnetic heater element can be held in place by the solder preform 10, it need not be formed as a ring to completely encompass the objects to be joined. Accordingly, the solder preform will not act as a shield to the generation of inductive current in the ferromagnetic heater.

Figure 2A:
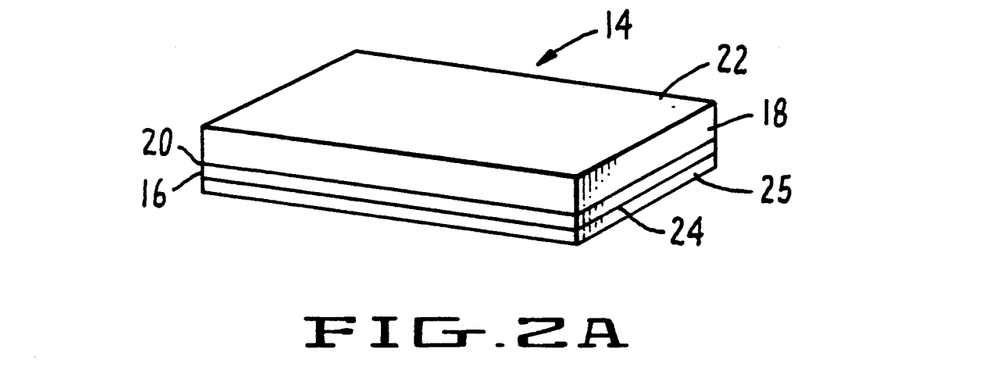
FIG. 2A is one embodiment of a heater element for use in a connecting device designed in accordance with the present invention.

As shown in FIG. 2A, the ferromagnetic heater element 14 is, in an exemplary embodiment, formed from a layer 16 of ferromagnetic material having a first surface bonded to a second surface 20 of a copper layer 18. The ferromagnetic heater element possesses a Curie temperature greater than the fusion temperature of the solder preform 10. A second surface 22 of the copper layer 18 which is opposite the surface bonded to the ferromagnetic material is pre-tinned to enhance bond to and transmission of heat to the objects to be joined. A second surface 24 of the ferromagnetic material opposite the surface bonded to the copper layer is treated with a non-solder wetting coating 25 to inhibit wetting of molten solder onto the ferromagnetic layer.

In order to prevent the ferromagnetic heater element 14 from being wetted by solder, the element 14 is coated with a non solder wetting coating 25 such as polytetrafluoroethylene or a polyamide. Another method is to form a oxide coating from the ferromagnetic material itself. The purpose of such a coating as indicated above, is to prevent wetting of the ferromagnetic material by solder which would prevent the generation of the correct amount of energy by magnetic induction and prevent the ferromagnetic material from heating to its effective Curie temperature. Specifically, if solder were allowed to wet the ferromagnetic material it would reduce the resistivity and would act as a shield to the induction field and thus reduce power. Such an occurrence would produce a cold solder joint or an even more defective solder joint. The coating material employed will not be wetted by solder and thus when contacted by it, the solder will tend to bead and be diverted (in the present invention squeezed out) from the region adjacent the convex segment of the pin. The coating must also have sufficient temperature resistance to remain intact at the material's Curie temperature.

Figure 2B:
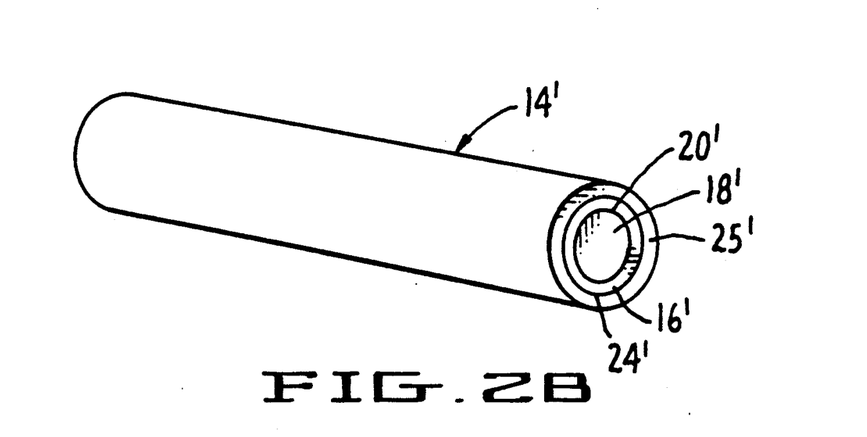
FIG. 2B is another embodiment of a heater element wherein the element is rod shaped.

FIG. 2B illustrates a rod shaped heater element 14' having a layer 16' of ferromagnetic material having a first surface bonded to a first surface 20' of a copper layer 18'. A second surface 24' of the ferromagnetic material may be coated with a non solder wetting coating 25' to inhibit wetting of molten solder. More than one rod can be used in a device and other cross sections, e.g. square, are considered to be within the scope of the invention.

In operation, the connecting device is electrically heated using a constant frequency, external AC current source and induction coil to induce currents primarily in the ferromagnetic heater element 14 along with the objects to be joined.

As the current passes through the ferromagnetic heater element 14, the temperature of the heater element approaches its Curie temperature. The heat generated by the ferromagnetic heater element heats the FIG. 1 connecting device and causes the hollow plastic sleeve 4 to shrink in response thereto. As the shape of the hollow sleeve 4 recovers, it moves the ferromagnetic heater element and molten solder of the solder preform 10 toward the objects placed into the solder sleeve device are to be joined to one another.

Due to the configuration of the connecting device in FIG. 1, the ferromagnetic heater element does not completely encompass a circumference of conductive objects to be joined. Accordingly, a current is also induced in the objects to be joined, which permits molten solder produced from the solder preform 10 to more evenly bond the objects. That is, because the objects to be joined are also inductively heated, a more rapid melting and joining of the member can be obtained. However, care must be taken to insure that a majority of the heat is generated by the self-regulating heater element and not the non-self-regulating members to be joined. If this were allowed to occur uncontrolled increases in temperature would result along with possible damage to the object to be joined. The hollow plastic sleeve further responds to the heat generated by the ferromagnetic heater element 14 and continues to recover around the junction between the objects, thus restricting the flow of solder around the junction and sealing the junction against contaminants such as moisture.

Figure 3A:
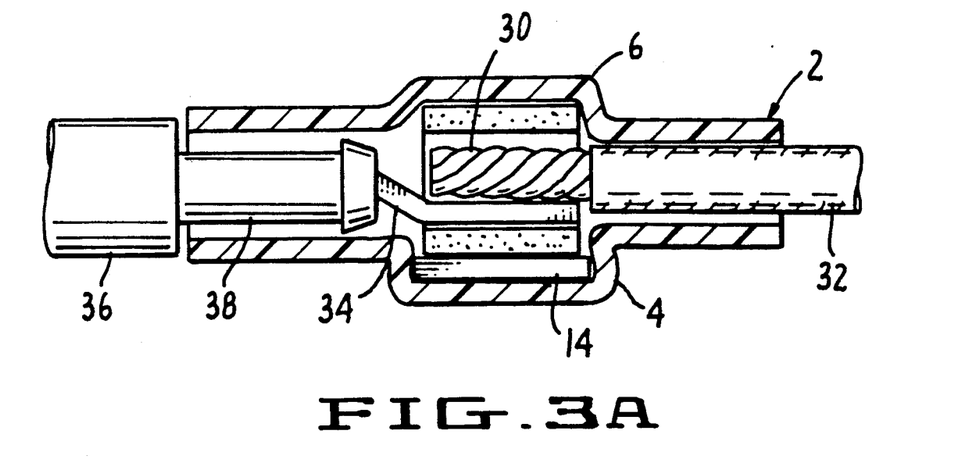
FIGS. 3A–C are another embodiment of a connecting device designed in accordance with the present invention.
Figure 3B:
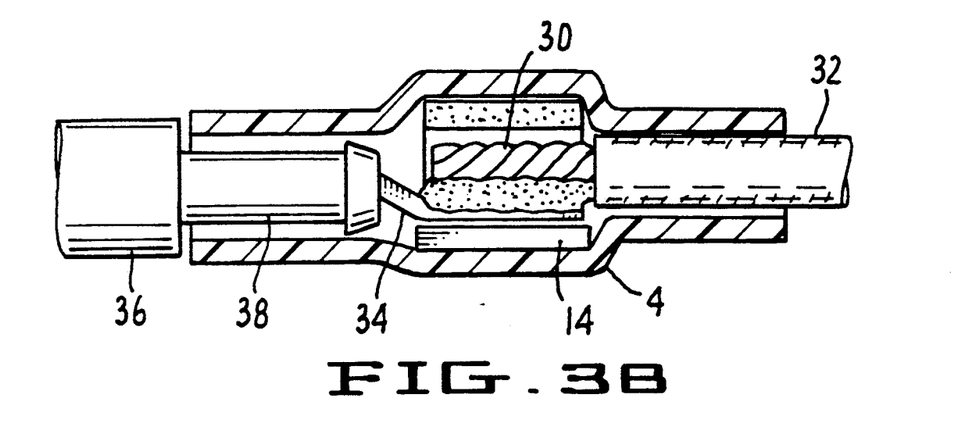
Figure 3C:
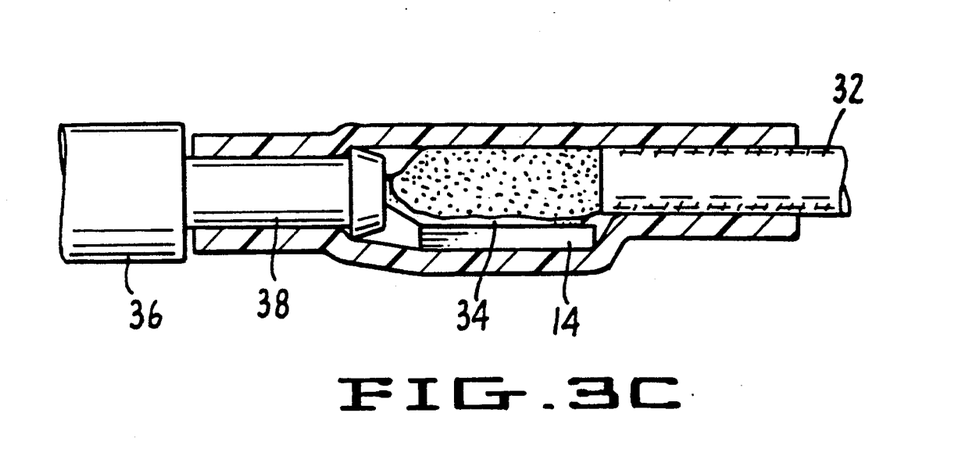

FIGS. 3A-3C show portions of an exemplary embodiment of the FIG. 1 connecting device. For example, the device of FIGS. 3A-3C can be used in connecting an object such as a stripped wire to another object such as a contact terminal disposed in a prefabricated connector housing. In FIG. 3A, an electrical wire element 30 having an insulating jacket 32 is to be joined with a standard, non-ferromagnetic contact 34. The contact 34 is, for example, part of a terminal connector housing 36 having a cylindrical flange 38 from which the contact extends outward Use of the FIG. 3 connecting device facilitates connection of the electrical wire element 30 to the standard contact 34 by avoiding any special materials to be incorporated in the contact 34. Further, the FIG. 3 connecting device seals the junction between the wire element 30 and the contact 34.

In operation, the cylindrical flange 38 having a standard contact 34 is inserted into one end of the heat shrinkable plastic hollow sleeve such that the contact 34 is positioned within the central portion 6 of the hollow sleeve. A stripped end of the electrical wire 30 is inserted into an end of the hollow sleeve 4 opposite the end at which the contact 34 is placed into the sleeve. An external AC current source induces an electrical current in the heater element 14 as well as the contact 34 and the electrical wire element 30.

As the ferromagnetic heater element 14 heats, the plastic hollow sleeve 4 begins to partially recover, as shown in FIG. 3B, such that the solder preform 10 is positioned into contact with the heater element 14. The pre-tinned surface between the heater element 14 and the partially molten solder preform 10 results in a transfer of heat to the contact 34 and the electrical wire element 30 via the solder preform 10. Additional heat is generated in the contact 34 and the electrical wire element 30 due to current induced in these components by the external current source.

As the connecting device 2 continues to heat, the plastic hollow sleeve shrinks further and additional heat is subsequently transferred to the wire element 30. An even flow of molten solder is thus provided around the entire junction between the wire element 30 and the contact 34 to form a solid connection as shown in FIG. 3C. As can be seen therein, further shrinkage of the plastic hollow sleeve 4 ensures a proper sealing of the junction.

Figures 4, 5:
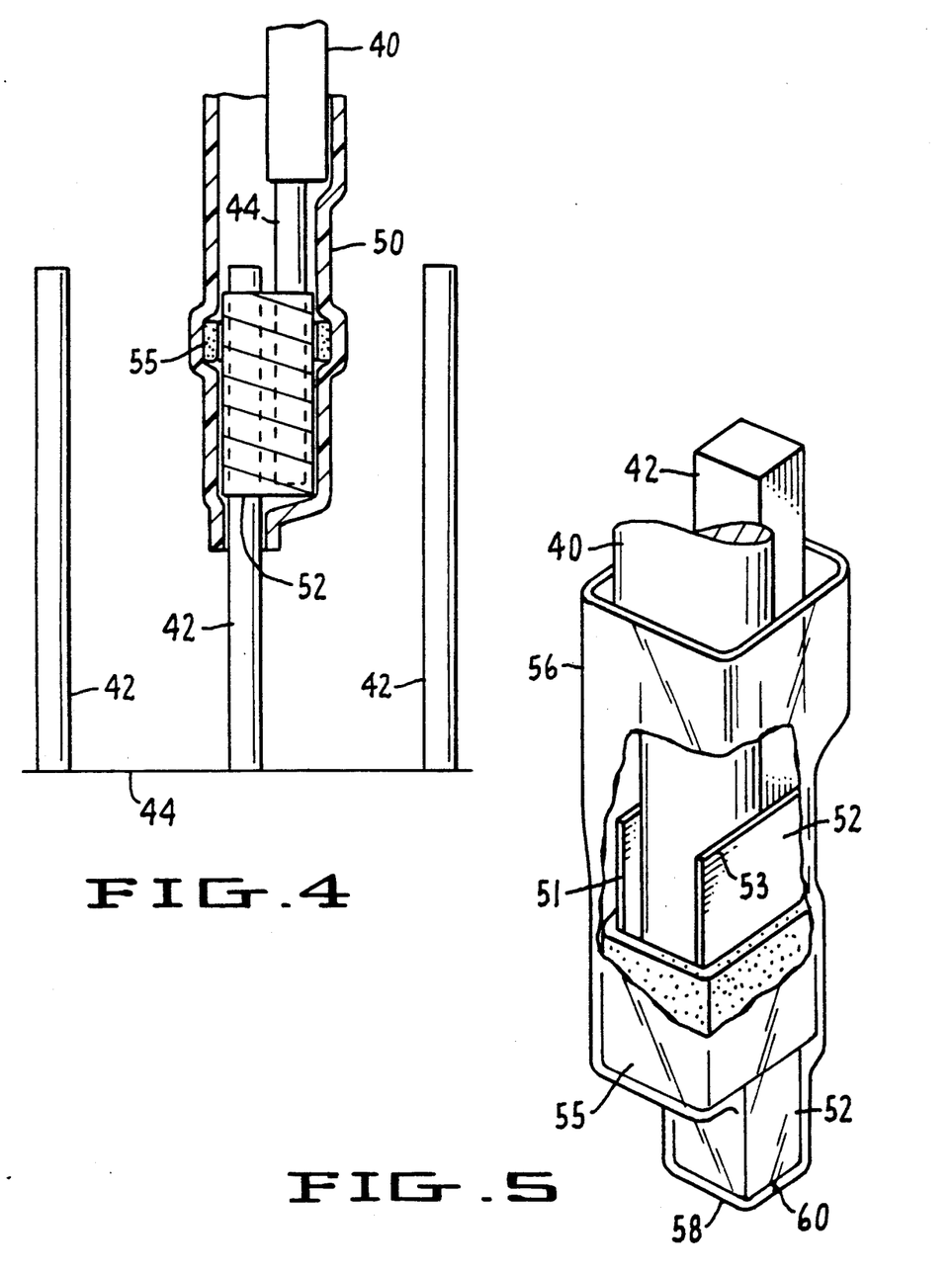
FIGS. 4 and 5 show yet further embodiments of the present invention.

FIG. 4 shows yet another exemplary embodiment of the present invention for use in creating an effective, soldered connection between an electrical wire element 40 and a pin 42 of a junction block 44. A heat shrinkable plastic hollow sleeve 50 is fashioned with a shape similar to that described above with respect to FIG. 1. The hollow sleeve includes a U-shaped ferromagnetic heater element 52 which does not completely encompass an inner circumference of the solder sleeve device. Like the FIG. 1 embodiment, a solder preform 55 is included between the heater element 52 and the hollow sleeve 50. Molten solder flows into a junction between the objects to be joined via the opening in the U-shaped heater element upon activation of the connecting device Upon insertion of the pin 42 and the electrical wire element 40 into opposite ends of the hollow sleeve 50, a current is induced in the heater element and in the objects to be joined (i.e., pin 42 and wire element 40). As with the aforementioned embodiments, the hollow sleeve 50 begins recover, causing molten solder to flow about the pin and the electrical wire element, thus forming a solid junction. Again, because the U-shaped ferromagnetic heater element does not completely encompass the objects to be joined, a current is induced in the objects to be joined providing more even heat distribution. Because the surface of the heater element facing the objects to be joined is pre-tinned this enhances the transfer of heat from the heater element to wire 44 and pin 42.

FIG. 5 shows an embodiment of the FIG. 4 connecting device in greater detail. More specifically, the U-shaped configuration of the ferromagnetic heater element 52, as illustrated in FIG. 5, includes two arms 51 and 53 which are limited to the combined width of pin 42 and electrical wire element 40. Further, the arms 51 and 53 are slightly bent inward toward the post 52 to provide relatively tight contact between the electrical wire element 40, the pin 42 and the U-shaped ferromagnetic heater element.

A solder preform 55 is wrapped around a portion of the U-shaped ferromagnetic heater element 52. Further, a heat shrinkable plastic outer tubing 56 is provided, and is formed about the exterior of the U-shaped ferromagnetic heater element 52 and the wrapped solder preform 55.

Because pin 42 is one of the objects to be connected, the connecting device as shown in FIG. 5 can be formed with a bottom portion 58 to assist in retaining the pin 42 within the connecting device. Further, the arms 51 and 53 of the ferromagnetic heater element 52 can be formed with a varying width which tapers off from the combined width of the pin 42 and the electrical wire element 40 to the width of the pin 42 alone as shown in FIG. 5. The thinner width of the arms 51 and 53 occurs at a lower portion of the connecting device near the bottom portion 58.

If the U-shaped heater element 52 extends along the length of the connecting device to the bottom portion 58, as in the exemplary FIG. 5 embodiment, the arms of the heater element can be joined to provide a surface 60 for abutting against the bottom portion 58 of the tubular outer sleeve. The heater element will then provide additional support to assist in retaining pin 42 within the connecting device The self-regulating connecting device in the exemplary FIG. 5 device has been described to include a ferromagnetic heater element with an enlarged heater surface relative to the embodiments of FIGS. 1 to 4. However, it will be appreciated by those skilled in the art that while the enlarged heater element surface assists in positioning the pin 42 in the connecting device, a heater element of reduced size can be used in the FIG. 5 embodiment to improve visibility of a junction created between the pin 42 and the electrical wire element 40. More specifically, the use of a heater element formed as a plate will encompass less of the inner circumference of the heat shrinkable hollow outer sleeve and enable a greater portion of the junction between objects placed into the connecting device to be visually examined.

In all of the foregoing embodiments, visual examination of a junction between objects is achieved by using any known, relatively transparent heat shrinkable hollow sleeve such as polyvinylidene fluoride (Kynar). Accordingly, use of a relatively small heater element permits a greater area of the junction to be examined to ensure an even, and complete flow of the molten solder has occurred. As previously mentioned, the heat generated in the self-regulating heater must be the dominant form of heat generation of all the objects heated. Otherwise, uncontrolled heating and excessive temperatures will result.

Figure 6A:
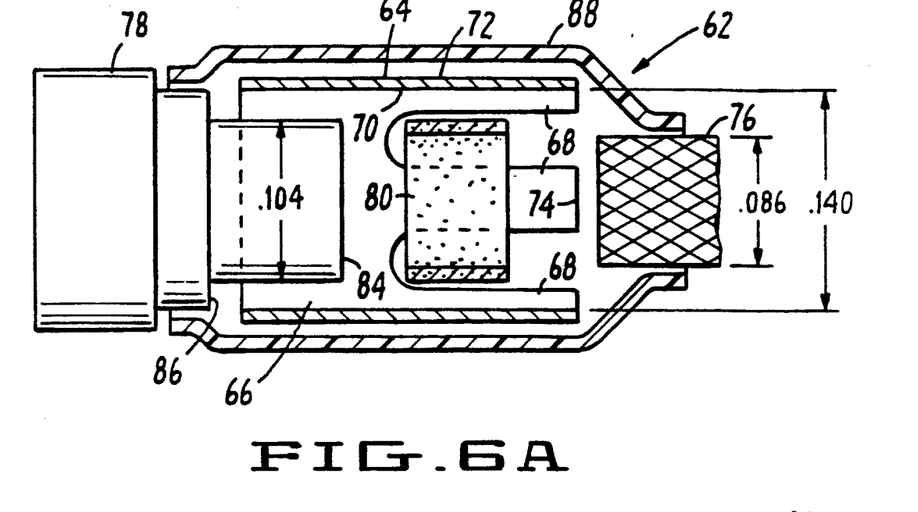
FIGS. 6A, 6B and 7 show yet further embodiments of the present invention for use with braided shielding cable.
Figures 6B, 7:
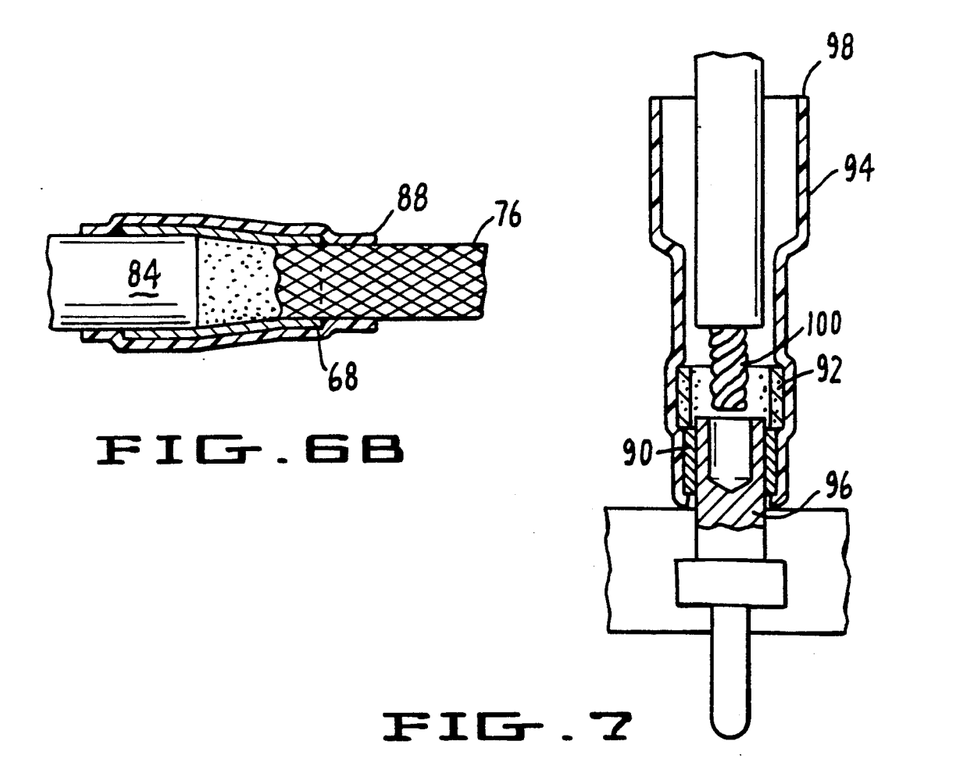

FIGS. 6 and 7 are directed to yet further exemplary embodiments of connecting devices useful for joining a braided shielding cable (e.g., coaxial cable) to a connecting device. For example, as shown in FIG. 6A, a solder sleeve device 62 includes a split cylindrical ring of ferromagnetic heater element 64 having, for example, an inner diameter of 0.140 inches. The heater element 64 is formed with a barrel section 66 over approximately one-half of its length, and includes four tines or fingers 68 over the remaining half of its length. Further, the heater element in FIG. 6A is formed with an interior pre-tinned surface 70 and is clad on an exterior surface 72 with a non-solder wetting coated as described with respect to FIG. 2.

Prior to activation, ends 74 of the tines 68 are held in a position located about the periphery of a circle having a diameter which corresponds to the inner diameter of the barrel portion 66. However, once a braided shielding cable has been inserted into the connecting device and a current induced therein, the melting of the solder preforms allow the tines 68 to bend inward to grip the cable in a manner to be discussed below.

A ring-like solder preform 80 having an inner diameter slightly greater than the outer diameter of the braided shielding cable is placed within the half of the cylindrical ferromagnetic heater element formed by the tines 68.

Due to mechanical strength requirements, the cylindrical cable connector 78 is formed from a high strength and high thermal conductivity material, e.g., brass, with a cylindrical end 84 of relatively small diameter for connection with the braided shielding cable 76. Accordingly, the outer diameter of the cylindrical end 84 is slightly smaller than the inner diameter of the barrel section 66 of heater element 64. For example, the outer diameter of the cylindrical end 84 is approximately 0.104 inches. An inner diameter of the cylindrical end 84 is slightly greater than the outer diameter of a standard shielded coaxial cable. For example, the inner diameter of the cylindrical end 84 is approximately 0.086 inches. A heat shrinkable hollow sleeve 88 is formed about the exterior of the heater element 64.

The ring-like solder preform 80 is formed with inner and outer diameters corresponding to those of the cylindrical end 84. Accordingly, the ring-like solder preform 80 will abut against the cylindrical end 84 when these two components are inserted into the heater element. The width of the cylindrical end 84 corresponds approximately to that of the barrel section 66 of heater element 64. The width of the ring-like solder preform 80 corresponds approximately to the length of the tines 68 of the heater element 64.

Accordingly, when the cylindrical end 84 of the connector 78 is inserted into the split barrel section end of the heater element, the pre-assembled solder preform 80 is inserted into the tined end of the heater element and abuts against the cylindrical end 84, to achieve proper location to further restrict over-insertion of the connector 78 into the solder sleeve device, the solder sleeve device can be formed with an outer diameter which is less than the outer diameter of a cylindrical mid-portion 86 of the connector 78.

In operation, the cylindrical end 84 of the connector 78 is inserted into the split barrel section 66 of the heater element 64. The solder preform 80 which has previously been pre-assembled into the tined end of the heater element 64 abuts against the cylindrical end 84 of the connector. A cable, such as braided shielding cable 76, which is to be joined to the connector 78 is inserted into the solder sleeve device through the solder preform and the cylindrical end 84. The heat shrinkable plastic outer sleeve 88 which has been formed about the exterior of heater element 64 and which extends beyond the tined end of the connecting device encompasses a portion of the braided shielding cable which extends from the tined end of the solder sleeve device.

Upon energizing the induction coil in the vicinity of the connecting device, a current is induced in the heater element 64 as described with respect to the aforementioned exemplary embodiments. Further, a current is induced in the objects to be joined; i.e., the braided shielding cable 76 and the connector 78.

As heat is generated in the heater element 64, the solder preforms begin to melt and flow about the braided shielding cable and the cylindrical end 84. At this point, the pre-formed tined ends 74 are allowed to contract inward toward the braid because the solder preform no longer holds them out. The tines contract toward the braided shielding cable to ensure a tight connection between the solder sleeve device and the cable. Molten solder is drawn into areas between the tines, with flow of the molten solder being restricted by continued contraction of the heat shrinkable hollow sleeve 88 about the tines.

With inward movement of the tines 68 in conjunction with continued contraction of the heat shrinkable hollow sleeve 88, molten solder flows into the barrel section 66 of the heater element. The molten solder is drawn toward the brass cylindrical end 84 which represents a high thermal load relative to the braided shielding cable. The connecting device thus provides a high integrity between the solder sleeve device, the cylindrical end 84 of connector 78 and the braided shielding cable 76.

A completed connection using the FIG. 6A connecting device is shown in FIG. 6B. Because the tines 68 of the heater element do not totally encompass the braided shielding cable, the solder sleeve device of FIG. 6A permits visual inspection of the junction between the connecting device, the connector and the braided shielding cable as shown in FIG. 6B. Further, the FIG. 6A connecting device permits current to be readily induced in the braided shielding cable and the connector 78, and thus promoting uniform heating and an even flow of solder about the cable and connector.

It will be appreciated that the connecting device as described above are not limited to the aforedescribed configurations. For example, FIG. 7 depicts use of a solder sleeve device similar to that of FIG. 6. However, unlike previously described embodiments, the exemplary FIG. 7 embodiment includes a ring-shaped ferromagnetic heater element 90 which is placed adjacent a ring-shaped solder preform 92. A heat shrinkable hollow sleeve 94 of a length greater than the combined length of the heater element and the solder preform is also provided.

The FIG. 7 connecting device is to be used to join two objects such as stranded wire conductor and a solder cup contact the heat shrinkable hollow sleeve could extend beyond the length of the heater element and solder preform to encompass the solder cup 96. The stripped end 100 of wire can be inserted into one end of the connecting device such that this end is located in the solder cup barrel.

In an exemplary embodiment, the heat shrinkable outer sleeve 94 is approximately 0.400 inches long, the heater element is approximately 0.060 inches long, and the solder preform is approximately 0.10 inches long. The heater element is approximately 0.008 inches thick, with an inner diameter of approximately 0.062 inches. The solder preform is approximately 0.008 inches thick, with an inner diameter of approximately 0.062 inches.

Further, it will be appreciated by those skilled in the art that other embodiments of the connecting devices described above are possible. For example, the solder sleeve device may be used with one or both of aligning pins and receptors of a multi-pin connector. Further, the connecting device may include a copper sleeve with axially-spaced rings of high mu materials of different Curie temperatures so as to produce different temperatures displaced in time and space to, for example, alter the relative time and extent of continuation of the heat shrinkable plastic hollow sleeve relative to melting of the solder preform. Further, the connecting device may have teeth or projections to help hold objects to be joined or to pierce insulation of an object to be joined.

The afore-described connecting devices, when used as pins in a junction block, may be connected for individual or gang heating so that a single pin or all pins may be connected. The connecting devices may also be formed into the edge connectors of printed circuit boards to produce strong mechanical connections.

Further, while exemplary embodiments have been described in the context of objects in the form of electrical wires or contacts joined via use of a solder perform as fusible material it will be appreciated that the fusible material may be any number of meltable materials commonly used for electrical, mechanical or plumbing applications. Also, several fusible materials may be incorporated in the same connecting device. A fusible material such as a polymer or resin can also be used to seal or environmentally protect the solder sleeve device. The same or another fusible material may be used to contain or direct the flow of solder.

While a heat shrinkable material activated by the heating action of the connector can shrink to enclose the connector area, a shrinkable material may also be used as a dam, after shrinking, to confine the molten material to appropriate regions. The molten material, if conductive, may further be used to permanently isolate the heater by shielding it from induced currents. Thus, when the molten material has migrated about or to the members to be connected, the molten material breaks the circuit by, for example, placing it at ground potential following activation of the connecting device.

The foregoing has described the principles, preferred embodiments and modes of operation of the present invention. However, the present invention should not be construed as being limited to the particular embodiments discussed. Instead, the above-described embodiments should be regarded only as illustrative, and it should be appreciated that workers skilled in the art may make variations in those embodiments without departing from the spirit or scope of the present invention as defined by the following claims.

What is claimed is:

1. A connecting device comprising:
   a fusible material; and
   a heating element having a predetermined Curie temperature, said heating element disposed adjacent said fusible material and independent of objects to be joined thereby, said heating element including a copper layer and a ferromagnetic layer adjacent said copper layer, said ferromagnetic layer being magnetically discontinuous.

2. A device as in claim 1, wherein at least a portion of said heating element has a non-solder wetting coating.

3. A device as in claim 1, wherein at least a portion of said heating device is pretinned.

4. A device according to claim 1, wherein said fusible material has a fusion temperature below the Curie temperature of said ferromagnetic member.

5. A connecting device for connecting two or more objects comprising;
   a heat recoverable hollow insulating sleeve;
   a fusible material disposed internally of said hollow insulting sleeve; and
   a heater element disposed internally of said hollow insulating sleeve said heater element including a metal layer and a ferromagnetic layer adjacent said metal layer, said ferromagnetic layer being magnetically discontinuous, said heater element including a pretinned layer of a first material, and a layer of a second material having a predetermined Curie temperature, a first surface of said second material having a non-solder wetting coating.

6. A connecting device according to claim 5, wherein said heater element is supported by said fusible material.

7. A connecting device according to claim 6, wherein said heater element is formed as a plate and said fusible material is formed as a ring-like preform.

8. A connecting device according to claim 5, wherein said heater element is adjacent to said fusible material.

9. A connecting device according to claim 5, wherein said heater element is formed as a hollow axially split cylinder having a barrel portion with tines extending therefrom.

10. A connecting device according to claim 9, wherein said fusible material is formed by at least one ring-like preform which is supported within said tines.

11. A connecting device according to claim 10, wherein said connecting device is activated via induced current flow within said heater element.

12. A connecting device according to claim 11, wherein upon activation of said connecting device, said tines contract toward said object being terminated.

13. A connecting device according to claim 11, wherein upon activation of said connecting device, said fusible material is placed into a molten state and is drawn through said heater element from said tines toward said barrel portion.

14. A connecting device according to claim 5, wherein said second material is a ferromagnetic material.

15. A connecting device according to claim 5, wherein said heat recoverable hollow insulating sleeve is formed of a translucent plastic material.

16. A connecting device according to claim 5, wherein said heater element is U-shaped.

17. A connecting device according to claim 5, wherein at least one object to be connected is a terminal of a multipin connector.

18. A connecting device according to claim 5, wherein at least one object to be connected is braided shielding cable.

19. A connecting device according to claim 5, wherein at least one object to be connected is a pipe.

20. A connecting device for connecting two or more objects comprising:
    a heat recoverable hollow insulating sleeve;
    a fusible material disposed internally of said hollow sleeve; and
    a heater element having a predetermined Curie temperature and including a metal layer and a ferromagnetic layer adjacent said metal layer, said heater element being supported by said fusible material internally of said hollow insulating sleeve, said ferromagnetic layer being magnetically discontinuous.

21. A connecting device according to claim 20, wherein said heater element further comprises:
a pretinned layer of a first material; and,
a layer of a second material having a predetermined Curie temperature, a surface of said second material having a non-solder wetting coating.

22. A connecting device according to claim 21, wherein objects to be connected are inserted into said connecting device and directly fused with one another.

23. Method of connecting two or more objects comprising the steps of:
inserting said objects into a connecting device which includes a heat recoverable hollow insulating sleeve having a fusible material and a heater element disposed internally of said hollow sleeve, said heater element including a magnetically discontinuous ferromagnetic layer;
inducing a current in said heater element such that the current is discontinuous around said heater element and said heat recoverable hollow insulating sleeve contracts, bringing the heater element into contact with objects to be joined and placing said fusible material into contact with at least one of said objects to be connected.

24. Method according to claim 23, wherein said objects are fused directly to one another 25. Method according to claim 23, wherein said step of inducing current further causes deformation of said heater element to control flow of said fusible material.

26. Method according to claim 23, further comprising a step of inspecting a junction between said objects following said step of inducing current.

27. Method according to claim 23, wherein said heater element has a Curie temperature greater than a fusion temperature of said fusible material.

* * * * *